(12) United States Patent
Haubrich et al.

(10) Patent No.: US 8,754,145 B1
(45) Date of Patent: Jun. 17, 2014

(54) RADIATION CURABLE HARDCOAT WITH IMPROVED WEATHERABILITY

(71) Applicant: Momentive Performance Materials Inc., Albany, NY (US)

(72) Inventors: Jeanne Elizabeth Haubrich, Waterford, NY (US); Sona Sivakova Slocum, Painesville, OH (US)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

(21) Appl. No.: 13/721,810

(22) Filed: Dec. 20, 2012

(51) Int. Cl.
| | | |
|---|---|---|
| *C08F 2/50* | (2006.01) | |
| *C08F 2/46* | (2006.01) | |
| *B29C 71/04* | (2006.01) | |
| *A61L 2/08* | (2006.01) | |
| *A61L 24/00* | (2006.01) | |
| *C08G 61/04* | (2006.01) | |
| *C08F 2/48* | (2006.01) | |
| *C08F 8/00* | (2006.01) | |
| *C08F 255/02* | (2006.01) | |
| *B29C 59/16* | (2006.01) | |
| *B29C 65/14* | (2006.01) | |

(52) U.S. Cl.
CPC ... *C08F 2/50* (2013.01); *C08F 2/48* (2013.01); *C08F 8/00* (2013.01); *C08F 255/02* (2013.01); *B29C 59/16* (2013.01); *B29C 65/1409* (2013.01); *B29C 65/1412* (2013.01)
USPC ...... 522/6; 522/1; 522/71; 522/189; 522/184; 520/1

(58) Field of Classification Search
CPC ................ C08F 2/50; C08F 2/48; C08F 8/00; C08F 255/02; B29C 59/16; B29C 65/1409; B29C 65/1412

USPC ......................... 522/6, 1, 71, 189, 184; 520/1
See application file for complete search history.

(56) References Cited

U.S. PATENT DOCUMENTS

| | | | |
|---|---|---|---|
| 4,455,205 A | 6/1984 | Olson et al. | |
| 4,486,504 A | 12/1984 | Chung | |
| 4,491,508 A | 1/1985 | Olson et al. | |
| 5,162,390 A | 11/1992 | Tilley et al. | |
| 5,391,795 A | 2/1995 | Pickett | |
| 5,466,491 A | 11/1995 | Factor et al. | |
| 5,571,570 A * | 11/1996 | Lake | 427/494 |
| 5,990,188 A * | 11/1999 | Patel et al. | 522/28 |
| 6,087,413 A | 7/2000 | Lake | |
| 6,110,988 A | 8/2000 | Lake | |
| 6,998,425 B2 * | 2/2006 | Chisholm et al. | 522/182 |
| 2009/0297724 A1 | 12/2009 | Weber | |

OTHER PUBLICATIONS

International Application No. PCT/US2013/076322, International Search Report and Written Opinion, dated Feb. 24, 2014, 17 pages.

* cited by examiner

*Primary Examiner* — Ling Choi
*Assistant Examiner* — Jessica E Whiteley
(74) *Attorney, Agent, or Firm* — Hoffman Warnick LLC

(57) ABSTRACT

Disclosed is a transparent, radiation curable acrylate coating composition comprising (a) at least three polyfunctional acrylate derivatives, (b) a photoinitiator selected from the group consisting of phosphine oxides, ketones, and combinations thereof, (c) a nanoscale filler, and (d) a dibenzoyl resorcinol UV absorber, at least one of said acrylate derivatives being an aliphatic polyester urethane multi-acrylate having an acrylate functionality of at least 5 and an elongation of no greater than 5%, and at least two of said acrylate derivatives being diacrylates, wherein at least one of said diacrylates is an aliphatic Polyester urethane diacrylate having an elongation of greater than 5% and a number average molecular weight of from 500 to about 2500 and wherein another of said diacrylates is a urethane-free diacrylate having a number average molecular weight of from about 150 to about 600.

26 Claims, No Drawings

RADIATION CURABLE HARDCOAT WITH IMPROVED WEATHERABILITY

BACKGROUND OF THE INVENTION

This invention generally relates to UV radiation curable acrylate-containing coating compositions, their use in coating articles, such as automotive headlamps, the cured coating or "hardcoats", and coated articles containing the coatings.

Hardcoats have been used commercially in a variety of applications, such as to protect optical displays. Certain applications, such as automotive headlamps, require that the coatings withstand the rigors of outdoor environments, ideally for the life of the motor vehicle itself. Desirable characteristics for hardcoats include abrasion resistance, good adhesion to the underlying substrate, resistance to microcracks, haze resistance and resistance to yellowing and other forms of discoloration.

Weatherable hardcoats also serve to protect plastics and other substrates that are used outside or exposed to sunlight through windows. The hardcoats protect the plastics from scratches and abrasion. The coatings also contain UV absorbers to shield the plastic from sunlight, helping to prevent photodegradation and coloring. The coatings may also protect the plastics from solvents, acids or bases.

Ultraviolet light (i.e. radiation curable) curable abrasion resistant coating compositions contain acrylate monomers and oligomers which can be cured using a free radical type of photoinitiator. For greater abrasion resistance, the coatings may contain nanoparticles functionalized to disperse in the coating. The ultraviolet radiation-cured coating compositions are advantageous because of their short curing times. These coatings provide increased weatherability, or abrasion resistance or a combination of weatherability and abrasion resistance to the underlying thermoplastic substrate.

Ultraviolet radiation-curable abrasion-resistant coatings are known in the art. U.S. Pat. No. 4,455,205 discloses compositions comprising a silyl acrylate, aqueous colloidal silica, a photoinitiator and optionally a polyfunctional acrylate. Other types of ultraviolet radiation-curable coating compositions are disclosed in U.S. Pat. Nos. 4,486,504; 4,491,508; and 5,162,390

U.S. Pat. Nos. 5,571,570; 5,990,188; 6,087,413: 6,110,988; and 6,998,425 disclose weatherable, UV curable coating compositions containing urethane acrylate oligomers and UV absorbers.

In view of the increasingly stringent outdoor weathering conditions that thermoplastic substrates, such as polycarbonates, are being subjected to, the coatings manufacturing community has a need for further enhancements in regard to durability and weatherability. The present invention provides one answer to that need.

SUMMARY OF THE INVENTION

In one aspect, the present invention relates to a transparent, radiation-curable acrylate coating composition comprising (a) at least three polyfunctionar acrylate derivatives, (b) a photoinitiator selected from the group consisting of phosphine oxides, ketones, and combinations thereof, (c) a nanoscale filler, and (d) a dibenzoyl resorcinol UV absorber, at least one of said acrylate derivatives being an aliphatic polyester urethane multi-acrylate having an acrylate functionality of at least 5 and an elongation of no greater than 5%, and at least two of said acrylate derivatives being diacrylates, wherein at least one of said diacrylates is an aliphatic polyester urethane diacrylate, having an elongation of greater than 5% and a number average molecular weight of from 500 to about 2500 and wherein another of said diacrylates is a urethane-free diacrylate having a number average molecular weight of from about 150 to about 600.

In yet another aspect, the present invention relates to an article comprising a substrate coated with this transparent, radiation curable acrylate-containing coating composition. The article is produced by coating at least a portion of said substrate with the curable acrylate coating composition, and curing the coating composition on said substrate.

In still another aspect, the present invention relates to an article being a cured composition on a substrate, wherein said cured composition is produced by radiation-curing a curable formulation on said substrate, said curable composition comprising at least three polyfunctional acrylate derivatives, a nanoscale filler, and a UV absorber, at least one of said acrylate derivatives having an acrylate functionality of at least 5 and an elongation of no greater than 5%, and at least two of said acrylate derivatives being diacrylates, wherein at least one of said diacrylates is an aliphatic polyester urethane diacrylate having an elongation of greater than 5% and a number average molecular weight of from 500 to about 2500 and wherein another of said diacrylates is a urethane-free diacrylate having a number average molecular weight of from about 150 to about 600, said cured composition having a delta % haze of less than 10 after Taber abrasion testing using CS10F wheels and 500 gram weights for 500 cycles, and said cured composition, after accelerated weathering using a Xenon arc Weather-o-meter to provide UV exposure of 11,000 kJ/m$^2$, exhibiting no cracks upon visual inspection, having a percent haze of less than 7, and a yellowness index (YI) of less than 4.

These and other aspects will become apparent upon reading the following detailed description of the invention.

DETAILED DESCRIPTION OF THE INVENTION

In this specification and in the claims that follow, reference will be made to a number of terms that shall be defined to have the following meaning.

The singular forms "a", "an" and "the" include plural referents unless the context clearly dictates otherwise.

"Optional" or "optionally" mean that the subsequently described event or circumstance may or may not occur, and that the description includes instances where said event or circumstance occurs and instances where it does not.

Each of the ranges presented in this disclosure may also include any subset of ranges included herein. "Percents" are weight percents unless otherwise specified, and "dry composition" and "dry coating composition" are intended to designate a curable or cured acrylate coating composition without solvents. "Molecular weights" are number average molecular weights unless otherwise specified.

"Transparent" coating is defined as a coating that, at the coating thickness used for a particular application, has, as a minimum, a % transmission of >80%. Preferably, the coating has % transmission of >90%. Transmission can be measured using a Byk-Gardner Haze Gard Plus, Model 4725.

The curable acrylate coating composition according to the invention comprises at least three polyfunctional acrylate derivatives, at least one photoinitiator, at least one nanoscale filler, at least one UV absorber, and optionally at least one solvent. The curable acrylate coating composition provides coatings possessing good adhesion to substrates, abrasion resistance, weather resistance and thermal crack resistance.

More specifically, the coating compositions of this invention, when applied and cured on polycarbonate substrates, give articles that show significantly improved stability to weathering compared to polycarbonate coated with other radiation-curable compositions. When coated at a thickness of between 8 and 15 microns, the coated article, after accelerated weathering with UV exposures, measured at 340 nm, of 10,000 kJ/m$^2$ to 14,000 kJ/m$^2$ or more, does not show delamination, cracking, excessive haze (% haze<7), notable yellowness (YI<4) or significant loss of adhesion. The UV exposure of 14,000 kJ/m$^2$ is equivalent to exposure of a flat panel at a 45 degree angle in Florida for 5 years. At the same time, the coating compositions also maintain excellent scratch and abrasion resistance required for automotive and other applications.

The three polyfunctional acrylate derivatives (also referred to herein as "multiacrylates") can be selected from the group consisting of any monomeric or oligomeric molecule possessing acrylic, methacrylic, ethacrylic, and the like groups, having a functionality equal to or greater than two. In one preferred embodiment, the three polyfunctional acrylate derivatives of the present invention comprise at least one aliphatic polyester urethane multi-acrylate having an acrylate functionality of greater than or equal to five, and at least two acrylate derivatives that are diacrylates, wherein at least one of said diacrylates is an aliphatic polyester urethane diacrylate.

A first acrylate suitably used in the invention is a urethane multiacrylate with functionality of at least five. Suitable urethane multiacrylates may be made by the initial reaction of an aliphatic diisocyanate of the formula OCN—R—NCO with an aliphatic polyol. Preferentially, the diisocyanate is a cycloaliphatic diisocyanate such as isophorone diisocyanate. The polyol may be an aliphatic diol, in which case the reaction yields a diisocyanate. Reaction of the diisocyanate with a hydroxyl substituted acrylate such as pentaerythritol triacrylate yields a urethane multiacrylate oligomer. Suitable urethane multiacrylates may also be purchased commercially. Examples of suitable commercially available urethane multiacrylates with functionality of at least five, include, but are not limited to, urethane hexaacrylates such as CN968, CN9010, CN9030, available from Sartomer, Ebecryl 8301, Ebecryl 1290, and Ebecryl 8702, available from Cytec, BR-941, available from Bomar, Etercure 6145, available from Eternal, and Miramer PU610, available from Miwon. Urethane acrylates with functionality higher than 6 may also be used. These include, but are not limited to, BR-991 urethane nonaacrylate, available from Bomar, CN9013 urethane nonaacrylate, available from Sartomer, and Miramer PU9800 nonaacryalte, available from Miwon. The urethane multiacrylate with functionality of at least five should be present in an amount of from about 10 to about 80 percent based on the total weight of the dry coating composition. Preferably, it should be present in an amount of from about 30 to about 60 percent based on the total weight of the dry coating composition. The urethane multiacrylate should preferably have elongation of 5% or less.

Mixtures of more than one urethane multiacrylate with functionality of at least five may also be used.

A second acrylate suitably used in the invention is an aliphatic urethane diacrylate with elongation of greater than 5%. Preferably, elongation should be 20-80%. Suitable urethane diiacrylates may be made by the initial reaction of an aliphatic diisocyanate of the formula OCN—R—NCO with an aliphatic diol to yield a diisocyanate. The aliphatic diol is preferably a polyester diol. Reaction of the diisocyanate with a hydroxylated monoacrylate yields a urethane diacrylate suitably having a molecular weight of from about 500 to about 2500. Suitable hydroxylated monoacrylates include but are not limited to, hydroxypropylacrylate, hydroxyethylacrylate, and hydroxybutyl acrylate. The second acrylate is present in an amount of from about 5 to about 50% based on the total weight of the dry composition. Preferably, the second acrylate is present of from about 10 to about 30% based on the total weight of the dry coating composition.

A third acrylate suitably used in the invention is a urethane-free aliphatic diacrylate suitably having a lower molecular weight than that of the second acrylate. The third acrylate typically has a number average molecular weight of from about 150 to about 600 and is [diacrylates are] commercially available from companies such as Cytec and Sartomer. Suitable aliphatic diacrylates include, but are not limited to, 1,4-butanediol diacrylate, 1,6-hexanediol diacrylate, polyethylene glycol diacrylate, propoxylated neopentyl glycol diacrylate, polyethylene glycol (400) diacrylate, and polypropylene glycol diacrylate. Preferably the diacrylate is a material that gives good adhesion to polycarbonate without causing haze when used in the proper amount. Preferred diacrylates include 1,4-butanediol diacrylate, 1,6-hexanediol diacrylate, and propoxylated neopentyl glycol diacrylate. The third acrylate is present in an amount of from about 3 to about 30%, and preferably in an amount of from about 5 to about 15%, based upon the total weight of the dry coating composition.

In addition to the three multiacrylates, other aliphatic acrylate monomers and oligomers may also be used. Examples of other acrylate monomers and oligomers that may be used include, but are not limited to, dipentaerythritol pentaacrylate, pentaerythritol triacrylate, pentaerythritol tetraacrylate, ethoxylated pentaerythritol tetraacrylate, di-trimethylolpropane tetraacrylate, trimethylolpropane triacrylate, ethoxylated trimethylolpropane triacrylate, trimethylolpropane trimethacrylate, aliphatic urethane acrylate oligomers, polyester acrylate oligomers, aliphatic acrylates with functionality of one, such as isobornyl acrylate, alkylacrylates, tetrahydrofurfuryl acrylate, urethane monoacrylates such as Ebecryl 1040, available from Cytec, and combinations thereof.

Typically, the total amount of all polyfunctional acrylates present in the cured acrylate coating composition of the present invention is in the range of from about 30 and about 95 percent, preferably from about 50 to about 80 percent, based on the total weight of the dry coating composition, or any range therebetween.

It is believed that the urethane polyester acrylate having functionality of at least five provides enhanced scratch and abrasion resistance, as well as solvent resistance, to compositions of the present invention, whereas the difunctional urethane acrylate improves flexibility and reduces shrinkage during cure. The third diacrylate helps provide good initial adhesion to plastic substrates such as polycarbonate. After curing on a substrate, the cured composition exhibits improved adhesion after weathering, as well as reduced cracking, reduced coating haze, and reduced delamination, enabling significantly longer lifetime of the coated article than may have been achieved heretofore. A combination of urethane acrylate having functionality of at least five and the nanoparticles is necessary to achieve good abrasion resistance for applications such as automotive forward lighting.

At least one initiator for ultraviolet light-induced curing (also referred to herein as "photoinitiator") of the coating compositions in used in the present invention. In preferred embodiments, at least one phosphine based photoinitiator is used. Suitable phosphine based photoinitiators include benzoylphosphorus compounds, including triorganobenzoyldiarylphosphine oxides, triorganobenzoyldiorgano phosphonates and triorganobenzoyl-diarylphosphine sulfides. The acylphospine oxide compounds are preferred and include 2,4,6-trimethylbenzoyldiphenylphosphine oxide, Bis(2,4,6-trimethylbenzoyl)-phenylphosphineoxide, bis(2,6-dimethoxybenzoyl)-2,4-4-trimethylpentyl phosphine oxide. All are available from BASF. Combinations of these phosphine oxide photoinitiators may also be used.

In some embodiments use of a phosphine based photoinitiator plus one or more other photoinitiators is preferred to improve cure. Suitable other photoinitiators include acetophenone and its derivatives, benzophenone and its derivatives, benzoin derivatives, e.g. benzoin isopropyl ether, benzil ketals, e.g. 2,2-dimethoxy-2-phenyl acetophenone, halomethyltriazines, e.g. 2-[2-(4-methoxy-phenyl)-vinyl]-4,6-bis-trichloromethyl-[1,3,5]triazine, xanthone derivatives, e.g. 2-isopropylthioxanthen-9-one, and the like. Preferred additional photoinitiators for transparent coating applications include photoinitiators that give low or no yellowing upon cure. These include 2-hydroxy-2-methyl-1-phenylpropan-1-one, 1-hydroxycyclohexylphenyl ketone, 4-(2-hydroxy-ethoxy)phenyl-(2-hydroxy-2-methylpropyl)ketone, and the like.

Typically, the photoinitiator or photoinitiators are present in an amount corresponding to between about 0.1 percent and about 10 percent based upon the total weight of the dry coating composition, or any range therebetween. In one embodiment, the photoinitiator is present in an amount corresponding to between about 1 percent and about 5 percent based upon the total weight of the dry coating composition.

Typically, the photoinitiator is activated by incident light having a wavelength between about 250 nanometers and about 420 nanometers. In certain embodiments the photoinitiator is activated by light having a wavelength between about 360 nm and about 420 nm. In other embodiments of the invention the photoinitiator is activated by light having a wavelength less than about 390 nm.

A nanoscale filler is also present in the curable acrylate coating. For transparent coating compositions, the fillers must be nanoscale size, having a particle size small enough not to scatter visible light. Preferably, the fillers have a particle size of no greater than 100 nanometers (nm). In one embodiment, the average particle size is preferably between about 10 nanometers and about 50 nanometers, or any range therebetween. In yet another embodiment of the present invention the average particle size is between about 15 nanometers and about 30 nanometers. As indicated earlier, alternative ranges include any subset therebetween.

Examples of materials suitable for use as nanoscale fillers include, but are not limited to silica, zirconia, titania, ceria, alumina, antimony oxide, zinc oxide, and mixtures thereof. In one embodiment of the present invention the nanoscale filler additionally comprises organic functional groups, such as acrylate functional groups.

In another embodiment of the present invention the nanoscale filler is acrylate functionalized silica. The acrylate functionalized silica can be produced by adding an acrylate functional alkoxy silane such as acryloxypropyl trimethoxysilane, methacryloxypropyl trimethoxysilane, acryloxypropyl triethoxysilane, or methacryloxypropyl triethoxysilane and mixtures thereof, to an aqueous silica colloid, heating the mixture to promote hydrolysis of the silane and condensation of silanol groups present on the silica nanoparticles with silanol groups or alkoxysilane groups of the acrylate functional silanes, and exchanging the aqueous phase with an organic phase by vacuum stripping. Replacement of the aqueous phase with an organic phase is necessary to allow solution blend of the functionalized silica particles with the other coating components. Suitable materials for the organic phase may be acrylates or organic solvents with a boiling point higher than that of water.

The amount of nanoscale filler in the curable acrylate coating composition may be adjusted depending upon the desired useable life and the required property such as adhesion, abrasion resistance, good weather and thermal crack resistance to name a few. The nanoscale filler in the curable acrylate coating composition is present in an amount of about 1 percent to about 65 percent based upon the total weight of the dry coating composition, or any range therebetween. In one preferred embodiment, the nanoscale filler is present in an amount of from about 3 percent to about 40 percent, advantageously from about 5 to about: 30 percent, based upon the total weight of the dry coating composition.

The curable acrylate coating composition contains one or more ultra violet ("UV") absorbers. The amount of UV absorbers will depend upon the particular use or application desired. Their amounts will be sufficient to provide increased weatherability yet still obtain adequate UV cure response for the composition.

A particularly preferred type of UV absorber is based on dibenzoylresorcinol, and includes 4,6-dibenzolyresorcinol and derivatives. These UV absorbers may also be silylated, which can aid solubility of the UV absorber in a resin, and can result in better weathering performance, as shown in U.S. Pat. No. 5,990,188. Examples of 4,6-dibenzoyl resorcinol UV absorbers have the formula

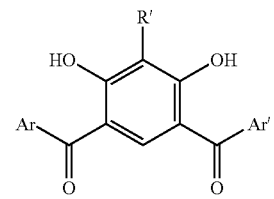

Formula 1 where Ar and Ar' are independently substituted or unsubstituted monocyclic or polycyclic aryl groups and R' is H or a linear or branched alkyl chain. Examples of silylated 4,6-dibenzoyl resorcinol UV absorbers have formula

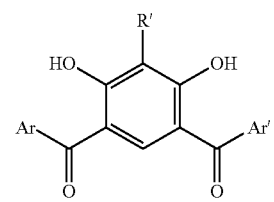

Formula 1 where Ar and Ar' are independently substituted or unsubstituted monocyclic or polycyclic aryl groups and R' is a linear or branched alkyl chain having less than about 10 carbons bearing a —$Si(OR^2)_3$, where $R^2$ is a $C_1$ to $C_6$ alkyl group, such as 4,6-dibenzoyl-2-(3-trimethoxysilylpropyl) resorcinol and 4,6-dibenzoyl-2-(3-triethoxysilylpropyl) resorcinol.

In some embodiments, more than one UV absorber based on derivatives of dibenzoyl resorcinol may be used. In other embodiments, the UV absorber based on dibenzoyl resorcinol may be combined with one or more other UV absorbers. Other types of UV absorbers include absorbers based on hydroxybenzophenone, hydroxyphenyl-benzotriazoles;

cyanoacrylates; hydroxyphenyltriazines; oxanilide derivatives; and poly(ethylene naphthalate). These include, but are not limited to, 2,4-dihydroxybenzophenone; 2,4,2',4'-tetrahydroxybenzophenone; 2-hydroxy-4-ocytyloxybenzophenone, 2-(2'-hydroxy-5'-methylphenyl)benzotriazole, [4-[(2-Hydroxy-3-(2'-ethyl)hexyl)oxy]-2-hydroxyphenyl]-4,6-bis(2,4-dimethylphenyl)-1,3,5-triazine, 2-(2H-Benzotriazol-2-yl)-6-(1-methyl-1-phenylethyl)-4-(1,1,3,3-tetramethylbutyl) phenol, and the like.

In one embodiment the coating composition of the invention employs at least one solvent which does not readily dissolve the plastic substrate of interest. In various embodiments said solvent has a boiling point above about 35° C. in order to facilitate leveling of the coating upon application to the substrate. Suitable solvents of this type include, but are not limited to, the group consisting of aliphatic alcohols, glycol ethers, cycloaliphatic alcohols, aliphatic esters, cycloaliphatic esters, aliphatic hydrocarbons, cycloaliphatic hydrocarbons, aromatic hydrocarbons, halogenated aliphatic compounds, halogenated cycloaliphatic compounds, halogenated aromatic compounds, aliphatic ethers, cycloaliphatic ethers, amide solvents, and sulfoxide solvents. In another particular embodiment the solvent is 1-methoxy-2-propanol. Generally, the concentration of the solvent in the coating composition is from about 10 percent to about 80 percent, preferably from about 30 percent and about 65 percent, based upon the total weight of the coating composition, or any range therebetween.

In one embodiment the curable acrylate coating composition may also optionally contain various additives such as surfactants (e.g. Byk 310, available from BYK-Chemie), reactive surfactants (e.g. Tego Rad 2100, available from Evonik) flattening agents (e.g BYK-353, available from BYK-Chemie), surface active agents (e.g. BYK-Siclean 3700, available from BHK-Chemie), thixotropic agents (e.g. Cellulose acetate butyrate, available from Aldrich Chemicals), and the like, and reaction products and combinations comprising at least one of the foregoing additives.

The above-described coating systems are applied to the surface of a solid substrate thus providing a coated solid substrate having improved weatherability. Such coated solid substrates may be thermoplastic substrates or weatherable substrates. The thermoplastic substrates that may be employed often include polymer substrates such as polycarbonates and polycarbonate blends, acrylic polymers including poly(methyl methacrylate), polyesters such as poly(ethylene terephthalate) and poly(butylene terephthalate), polyamides, polyimides, acrylonitrile-styrene copolymers, styrene-acrylonitrile-butadiene copolymers, polyvinyl chloride, polystyrene, blends of polystyrene and polyphenylene ethers, butyrates, polyethylene and the like. Thermoplastic substrates can be with or without pigments. Moreover, the solid substrates may also include metal substrates, painted surfaces, glass, ceramics, and textiles. However, the coating compositions of the instant invention are preferably employed to coat polycarbonates.

The curable acrylate coating composition could be coated on to articles employing conventional coating techniques. These may include, for example, flow coating, dip coating, roll coating, spray coating, or drawing down the coating onto the substrate using a doctor blade.

Applications for the coating compositions of the present invention include protective coatings for automotive headlamp lenses and protective coatings for glazing applications when polycarbonate is used instead of glass. The plastic windows have the advantage of low weight and impact resistance. Other applications include protective coatings for solar paneling, for architectural films, such as window film that reduce indoor heat, or for plastics used to protect outdoor signs and graphics.

For applications to a polycarbonate substrate, the coating composition should contain the above-described third acrylate being a urethane-free aliphatic diacrylate since this component tends to improve adhesion of the coating composition to polycarbonate.

The following examples are intended to illustrate, but not limit the scope of, the present invention.

EXAMPLES AND EXPERIMENTAL PROCEDURES

Percent Haze and % transmission were measured using a Byk-Gardner Haze Gard Plus, Model 4725. Yellowness index (YI, ASTM E313-75 (D1925)) was measured using a Gretag Macbeth Color-Eye.

Crosshatch adhesion testing was done using a method similar to ASTM D3359-95a, method B. For this test, a crosshatch pattern is cut in the coating using a Gardner scriber. A piece of tape (3M, Scotch 898) is pressed over the crosshatch, left for about a minute, and removed by quickly pulling on the tape. The adhesion is ranked from 5B to 0B, with 5B being the best adhesion, 0% coating loss, and OB being >65% coating lost. Values of 4B or 5B are considered passing for most applications.

Taber abrasion testing was done at 23° C.±2° C. and 50±5% relative humidity using CS10F wheels, 500 g weights, 500 cycles. Haze was measured using a Byk-Gardner Haze Gard Plus meter, model #4725 before and after abrasion to get a delta haze value for the coating.

Steel wool scratch resistance was tested using grade 0000 steel wool taped to a 1"×1" end of a bar weighing two pounds. The steel wool side was rubbed back and forth 5 times on the coating, and the coating was observed for scratches. The sample passes the test if there are no scratches. The number of scratches observed can be noted for a relative evaluation of failing samples.

Watersoak testing was done on coatings on Sabic Lexan LS2111 PC. The initial crosshatch adhesion was measured. The sample was then placed in a water bath at 65° C. At intervals of a few days, the sample was removed from the water bath, dried, and tested for crosshatch adhesion. Any visual signs of failure, such as clouding or delamination, were also noted. An adhesion of 5B or 4B after 10 days of watersoak is considered passing.

For accelerated weathering, coated PC panels were exposed in an Atlas Ci4000 Xenon Weather-Ometer'. Samples were irradiated using a modified ASTM G155 (Gmod) test method. The test was modified in that irradiance of 0.75 W/m$^2$ at 340 nm was used, and two borosilicate water cooled filters were used rather than quartz filters on the lamps. The borosilicate filter combination was used to give a better approximation of sunlight by blocking excess high energy UV light. Reported UV exposures are measured at 340 nm, and compared to outdoor weathering measured at 340 nm. Weathering results for samples are an average of results from 2 or 3 replicate panels.

For reporting weathering results, a sample was considered passing crosshatch adhesion if it had adhesion 4B or 5B, and failing if it had 0B to 3B. A weathered sample was considered passing haze testing if it had % haze <7.0. A sample was considered passing yellowness if yellowness index, YI, was <4. A sample was considered passing for cracking if there were no cracks visible without magnification or special lighting.

The UV absorber 4,6-dibenzoyl-2-(3-triethoxysilylpropyl)resorcinol can be obtained by synthesis as detailed in U.S. Pat. No. 5,391,795. Acrylate functionalized colloidal silica (AFCS) consisting of silica functionalized with methacrylpropyl-trimethoxysilane (A174NT, available from Momentive Performance Materials) dispersed 47-50% in hexanediol diacrylate (available from Cytec) can be obtained as in U.S. Pat. No. 5,466,491. Table 1 describes the acrylate monomers and oligomers used in these examples.

Examples A and B are comparative examples showing coating compositions without a urethane acrylate with a functionality of 2 to improve flexibility.

TABLE 1

Properties of acrylates used in examples.

| Material | Acrylate type | Available from | functionality | % elongation | Molecular Wt. |
|---|---|---|---|---|---|
| CN968 | polyurethane | Sartomer | 6 | 1 | 800-1000 |
| Ebecryl 1290 | polyurethane | Cytec | 6 | 2.5 | 1000 |
| CN9013 | polyurethane | Sartomer | 13 | 2 | 1400-1600 |
| CN2920 | polyurethane | Sartomer | 2 | 7 | 800-1000 |
| CN991 | polyurethane | Sartomer | 2 | 70 | 800-1000 |
| Ebecryl 8402 | polyurethane | Cytec | 2 | 50 | 1000 |
| Genomer 4215 | polyurethane | Rahn | 2 | 21 | |
| Photomer 6210 | polyurethane | BASF | 2 | 40 | 1400 |
| Photomer 6891 | polyurethane | BASF | 2 | 60 | 1500 |

Example 1

A radiation curable coating composition consisting of 1.2 parts Lucurin TPO (2,4,6-trimethylbenzoyldiphenylphosphine oxide, available from BASF), 0.4 parts of Tinuvin 123 (available from BASF), 2.8 parts of 4,6-dibenzoyl-2-(3-triethoxysilylpropyl)resorcinol, 0.04 parts Tego Rad2100 (available from Evonik), 8.1 parts of AFCS, which is about 50% acrylate functionalized colloidal silica and 50% hexanediol diacrylate, 17 parts of 1-methoxy-2-propanol (available from Dow Chemical), 55.0 parts of a solution of 50 weight % Ebecryl 1290 (available from Cytec) in 1-methoxy-2-propanol and 9.7 parts of a solution of 50% Photomer 6891 (available from BASF) in 1-methoxy-2-propanol was mixed in a brown Nalgene bottle and shaken 5-10 minutes, until all components were dissolved. An injection molded, ⅛" thick panel of Lexan LS2111 polycarbonate (PC) (available from Sabic) was rinsed using a stream of 2-propanol from a squirt bottle, and allowed to dry. The coating was flowcoated onto the rinsed PC panel, dried 2 minutes at room temperature and 4 minutes at 75° C., and cured using a UV conveyor equipped with two 300 W/in$^2$ Fusion H lamps. Samples were cured using a peak intensity of 0.5-0.6 W/cm$^2$, and a total UV exposure of 6.0 J/cm$^2$. Samples were tested for abrasion resistance, watersoak adhesion, and Xenon weathering as described above. Coated substrates were considered as passing adhesion testing after weathering if adhesion was 5B or 4B, passing haze testing if % haze was <7, passing yellowness testing if YI<4, and passing crack testing if there were no visible cracks.

TABLE 2

Urethane acrylates used in example compositions.

| Example | Urethane acrylate 1 | Parts Urethane acrylate 1, 50% in 1-methoxy-2-propanol | Acrylate 2 | Parts Acrylate 2, 50% in 1-methoxy-2-propanol |
|---|---|---|---|---|
| 1 | Ebecryl 1290 | 55.0 | Photomer 6891 | 9.7 |
| 2 | Ebecryl 1290 | 55.0 | CN991 | 9.7 |
| 3 | Ebecryl 1290 | 55.0 | Eb8402 | 9.7 |
| 4 | Ebecryl 1290 | 55.0 | Genomer 4215 | 9.7 |
| 5 | Ebecryl 1290 | 55.0 | Photomer 6210 | 9.7 |
| 6 | Ebecryl 1290 | 45.3 | CN991 | 19.4 |
| 7 | CN968 | 55.0 | CN2920 | 9.7 |
| 8 | CN968 | 55.0 | CN991 | 9.7 |
| 9 | CN9013 | 55.0 | CN991 | 9.7 |
| 10 | CN9013 | 48.5 | CN991 | 16.2 |
| Comparative A | Ebecryl 1290 | 64.7 | none | 0 |
| Comparative B | CN968 | 64.7 | none | 0 |

Examples 2-5

Radiation curable coating compositions were prepared as in Example 1, except the 9.7 parts of 50% Photomer 6891 in 1-methoxy-2-propanol was replaced with 9.7 parts of a 50% solution of a different urethane diacrylate in 1-methoxy-2-propanol, as shown in Table 2. Samples were coated and tested as described in Example 1. Test results are shown in Tables 3 to 5.

TABLE 3

Taber Abrasion and Watersoak Adhesion Results.

| Example # | 500 cycles Taber Delta Haze | Days Watersoak Adhesion Passed |
|---|---|---|
| 1 | 5.75 | 25 |
| 2 | 5.27 | 33* |
| 3 | 5.45 | 25 |
| 4 | 6.96 | 25 |
| 5 | 6.02 | 30 |
| 6 | 8.24 | 33* |
| 7 | 7.48 | 35 |
| 8 | 6.74 | 44 |
| 9 | 7.42 | 13* |
| 10 | 7.48 | 13* |
| Comparative A | 4.12 | 15 |
| Comparative B | 4.42 | 28 |

*tested ended prior to failure

Example 6

A radiation curable coating composition was prepared as in Example 1, except that 48.5 parts of a solution of Ebecryl 1290 in 1-methoxy-2-propanol was used instead of 55.0 parts, and 19.4 parts of a solution of 50 weight % CN991 in 1-methoxy-2-propanol was used instead of 9.7 parts of a solution of 50 weight % Photomer 6891 in 1-methyoxy-2-propanol, as shown in Table 2. Samples were coated and tested as described in Example 1. Test results are shown in Tables 3 to 5.

TABLE 4

Results after Xenon Weathering.

| | Highest Xenon Exposure Before Failure or before Test Ended | | | |
|---|---|---|---|---|
| Example | By Adhesion | By Haze | By Microcracks | By Yellowness (YI) |
| 1 | 13,100 | 15,500 | 11,800 | >15,500* |
| 2 | 10,800 | 12,900 | 11,700 | >15,500* |
| 3 | 14,400 | 15,500 | 14,400 | 13,100 |
| 4 | 14,400 | 15,500 | 14,400 | 14,400 |
| 5 | 14,400 | 15,500 | 14,400 | >15,500* |
| 6 | >14,000* | >14,000* | >14,000* | >14,000* |
| 7 | 9,000 | 13,500 | 10,100 | >14,200* |
| 8 | >14,200* | 13,500 | 12,500 | >14,200* |
| 9 | >13,500 | 11,100 | 11,100 | >13,500* |
| 10 | >13,500* | >13,500* | >13,500* | >13,500* |
| Comparative A | 6,700 | 11,700 | 8,400 | >11,700** |
| Comparative B | 11,500 | 10,100 | 9,000 | >11,500** |

*not tested further
**cannot measure after given value due to haze

Example 7-8

Radiation curable coating compositions were prepared as in Example 1, except the 55.0 parts of a solution of 50 weight % Ebecryl 1290 in 1-methoxy-2-propanol was replaced by 55.0 parts of a solution of 50 weight % CN968 (available from Sartomer) in 1-methoxy-2-propanol, and the 9.7 parts of 50% Photomer 6891 in 1-methoxy-2-propanol was replaced with 9.7 parts of a 50% solution of a different urethane diacrylate in 1-methoxy-2-propanol, as shown in Table 2. Samples were coated and tested as described in Example 1. Test results are shown in Tables 3 to 5.

Example 9

A radiation curable coating composition was prepared as in Example 1, except the 55.0 parts of a solution of 50 weight % Ebecryl 1290 in 1-methoxy-2-propanol was replaced by 55.0 parts of a solution of 50 weight % CN9013 (available from Sartomer) in 1-methoxy-2-propanol, and the 9.7 parts of 50 weight % Photomer 6891 in 1-methoxy-2-propanol was replaced with 9.7 parts of a 50 weight % solution of CN991 in 1-methoxy-2-propanol, as shown in Table 2. Samples were coated and tested as described in Example 1. Test results are shown in Tables 3 to 5.

TABLE 5

Numerical values and other results after 14,000 kJ/m² UV exposure in Xenon weathering.

| Example # | % Haze | YI | Adhesion | Cracking |
|---|---|---|---|---|
| 4 | 3.80 | 3.80 | 5 B | none |
| 5 | 4.78 | 4.07 | 5 B | none |
| 6 | 4.45 | 3.36 | 5 B | none |
| Comparative A | 12.65 | cannot measure* | 0 B | fail |

*cannot measure due to haze on sample

Example 10

A radiation curable coating composition was prepared as in Example 1, except the 55.0 parts of a solution of 50 weight % Ebecryl 1290 in 1-methoxy-2-propanol was replaced by 48.5 parts of a solution of 50 weight % CN9013 (available from Sartomer) in 1-methoxy-2-propanol, and the 9.7 parts of 50 weight % Photomer 6891 in 1-methoxy-2-propanol was replaced with 16.2 parts of a 50 weight % solution of CN991 in 1-methoxy-2-propanol, as shown in Table 2. Samples were coated and tested as described in Example 1. Test results are shown in Tables 3 to 5.

Comparative Example A

This example shows the performance of a coating composition that does not contain any urethane diacrylate component. A radiation curable coating composition was prepared as in Example 1, except the 55.0 parts of a solution of 50 weight % Ebecryl 1290 in 1-methoxy-2-propanol and the 9.7 parts of a solution of 50 weight % Photomer 6891 in 1-methoxy-2-propanol were replaced by 64.7 parts of a solution of 50 weight % Ebecryl 1290 in 1-methoxy-2-propanol, as shown in table 2. Samples were coated and tested as described in Example 1. Test results are shown in Tables 3 to 5.

Comparative Example B

This example shows the performance of a coating composition that does not contain any urethane diacrylate component. A radiation curable coating composition was prepared as in Comparative Example A, except the 64.7 parts of a solution of 50 weight % Ebecryl 1290 in 1-methoxy-2-propanol was replaced by 64.7 parts of a solution of 50 weight % CN968 in 1-methoxy-2-propanol as shown in table 2. Samples were coated and tested as described in Example 1. Test results are shown in Tables 3 to 5.

Example 11

This Example illustrates outdoor weathering results so far for a coating formula made according to this invention. The coating composition from example 2 was flowcoated on ⅛" thick panels of Lexan LS2111 PC (available from Sabic), dried 2 minutes at room temperature and 4 minutes at 75° C., and cured using a UV conveyor equipped with two 300 W/in² Fusion H lamps. Samples were cured using a peak intensity of 0.5-0.6 W/cm², and a total UV exposure of 6.0 J/cm². Samples were weathered outdoor in Florida and Arizona at a 45 degree angle according to SAE J576. After three years of weathering the % haze was 3.05, YI was 1.61, crosshatch adhesion was 5B, and there were no cracks in the sample.

What is claimed is:

1. A transparent, radiation-curable acrylate coating composition comprising (a) at least three polyfunctional acrylate derivatives, (b) a photoinitiator selected from the group consisting of phosphine oxides, ketones, and combinations thereof, (c) a nanoscale filler, and (d) a dibenzoyl resorcinol UV absorber, at least one of said acrylate derivatives being an aliphatic polyester urethane multi-acrylate having an acrylate functionality of at least 5 and an elongation of no greater than 5%, and at least two of said acrylate derivatives being diacrylates, wherein at least one of said diacrylates is an aliphatic polyester urethane diacrylate having an elongation of greater than 5% and a number average molecular weight of from about 500 to about 2500 and wherein another of said diacrylates is a urethane-free diacrylate having a number average molecular weight of from about 150 to about 600 wherein the aliphatic polyester urethane multi-acryalte is present in an amount of 10 weight percent to 80 weight percent of a dry coating, wherein the aliphatic polyester urethane diacrylate is present in an amount of 5 weight percent to 50 weight percent of the dry coating, and wherein the urethane-free diacrylate is present in an amount of 3 weight percent to 30 weight percent of the dry coating.

2. The curable acrylate coating composition according to claim 1 wherein the urethane-free diacrylate is selected from the group consisting of alkyldioldiacrylate, hexanediol diacrylate, alkoxylated hexanediol diacrylate, tripropylene glycol diacrylate, polyethylene glycol (400) diacrylate, and combinations thereof.

3. The curable acrylate coating composition according to claim 1 wherein the urethane multi-acrylate having an acrylate functionality of at least 5 is a urethane hexaacrylate.

4. The curable acrylate coating composition according to claim 2 wherein the alkyl moiety on the alkyldiolacrylate contains from four to eight carbons.

5. The curable acrylate coating composition according to claim 1 wherein the phosphine oxide photoinitiator comprises 2,4,6-trimethylbenzoyl-diphenyl-phosphine oxide or bis(2,4,6-trimethylbenzoyl)phenyl phosphine oxide.

6. The curable acrylate coating composition according to claim 1 wherein said coating composition further comprises (e) a solvent, said solvent being selected from the group consisting of aliphatic alcohols, glycol ethers, cycloaliphatic alcohols, aliphatic esters, cycloaliphatic esters, aliphatic hydrocarbons, cycloaliphatic hydrocarbons, aromatic hydrocarbons, halogenated aliphatic compounds, halogenated cycloaliphatic compounds, halogenated aromatic compounds, aliphatic ethers, cycloaliphatic ethers, amide solvents, sulfoxide solvents, and combinations thereof.

7. The curable acrylate coating composition according to claim 6 wherein said solvent is 1-methoxy-2-propanol.

8. The curable acrylate coating composition according to claim 1 wherein the dibenzoyl resorcinol UV absorber is 4,6-dibenzoyl resorcinol.

9. The curable acrylate coating composition according to claim 1 wherein the dibenzoyl resorcinol UV absorber is a silylated dibenzoyl resorcinol.

10. The curable acrylate coating composition according to claim 9 wherein the silylated dibenzoyl resorcinol is 4,6-dibenzoyl-2-(3-triethoxysilylpropyl) resorcinol.

11. The curable acrylate coating composition according to claim 4 which additionally comprises (f) a hindered amine light stabilizer.

12. The curable acrylate coating composition according to claim 1 wherein the polyfunctional acrylate derivatives are present in an amount such that the total amount of all polyfunctional acrylates present corresponds to between about 40 and about 80 percent by weight based upon the total weight of the curable acrylate coating composition.

13. The curable acrylate coating composition according to claim 6 wherein said hexafunctional acrylate derivative is present in an amount corresponding to between about 35 and about 50 percent by weight based upon the total weight of the curable acrylate coating composition.

14. The curable acrylate coating composition according to claim 1 wherein said photoinitiator is activated by light having a wavelength of less than about 420 nm.

15. The curable acrylate coating composition according to claim 1 wherein said nanoscale filler is selected from the group consisting of silica, zirconia, titania, alumina, ceria, and mixtures thereof.

16. The curable acrylate coating composition according to claim 1 wherein said nanoscale filler has a particle size of about 10 nanometers to about 250 nanometers.

17. The curable acrylate coating composition according to claim 1 wherein said nanoscale filler has a particle size in the range of between about 15 and about 50 nanometers.

18. The curable acrylate coating composition according to claim 1 wherein said nanoscale filler comprises silica having organic functional groups.

19. The curable acrylate coating composition according to claim 18 wherein said silica having organic functional groups is an acrylate functionalized silica.

20. The curable acrylate coating composition according to claim 6 wherein said nanoscale filler is present in an amount corresponding to between about 2 and about 15 percent by weight based upon the total weight of the coating composition.

21. The curable acrylate coating composition according to claim 1 wherein the ketone photoinitiator comprises 1-hydroxy-cyclohexyl-phenyl ketone.

22. An article coated with the curable acrylate coating composition according to claim 1.

23. A laminate comprising a substrate and a coating on said substrate, said laminate being produced by coating at least a portion of said substrate with the curable acrylate coating composition according to claim 1, and curing the coating composition on said substrate.

24. An article being a cured composition on a substrate, wherein said cured composition is produced by radiation curing a curable formulation on said substrate, said curable composition comprising at least three polyfunctional acrylate derivatives, a nanoscale filler, and a UV absorber, at least one of said acrylate derivatives having an acrylate functionality of at least 5 and an elongation of no greater than 5%, and at least two of said acrylate derivatives being diacrylates, wherein at least one of said diacrylates is an aliphatic polyester urethane diacrylate having an elongation of greater than 5% and a number average molecular weight of from 500 to about 2500 and wherein another of said diacrylates is a urethane-free diacrylate having a number average molecular weight of from about 150 to about 600, wherein the aliphatic polyester urethane multi-acryalte is present in an amount of 10 weight percent to 80 weight percent said cured composition, wherein the aliphatic polyester urethane diacrylate is present in an amount of 5 weight percent to 50 weight percent of the cured composition, and wherein the urethane-free diacrylate is present in an amount of 3 weight percent to 30 weight percent of the cured composition, said cured composition having a delta % haze of less than 10 after Taber abrasion testing using CS10F wheels and 500 gram weights for 500 cycles, and said cured composition, after accelerated weathering using a Xenon arc Weather-o-meter to provide UV exposure of 11,000 kJ/m$^2$, exhibiting no cracks upon visual inspection, having a percent haze of less than 7, and a yellowness index of less than 4.

25. The article of claim 24 wherein said cured composition is additionally free of cracks, has a percent haze of less than 7, and a yellowness index of less than 4, after 14,000 kJ/m$^2$ of accelerated xenon arc weathering.

26. The cured composition of claim 24 wherein said substrate comprises polycarbonate.

\* \* \* \* \*